United States Patent
Angel

(10) Patent No.: US 11,075,753 B2
(45) Date of Patent: Jul. 27, 2021

(54) SYSTEM AND METHOD FOR CRYPTOGRAPHIC KEY FRAGMENTS MANAGEMENT

(71) Applicant: Akeyless Security LTD., Hod Hasharon (IL)

(72) Inventor: Refael Angel, Jerusalem (IL)

(73) Assignee: AKEYLESS SECURITY LTD., Hod Hasharon (IL)

( * ) Notice: Subject to any disclaimer, the term of this patent is extended or adjusted under 35 U.S.C. 154(b) by 215 days.

(21) Appl. No.: 16/508,410

(22) Filed: Jul. 11, 2019

(65) Prior Publication Data

US 2021/0067334 A1 Mar. 4, 2021

Related U.S. Application Data

(60) Provisional application No. 62/696,472, filed on Jul. 11, 2018.

(51) Int. Cl.
*H04L 9/08* (2006.01)
*G06F 21/60* (2013.01)

(52) U.S. Cl.
CPC .......... *H04L 9/0869* (2013.01); *G06F 21/602* (2013.01)

(58) Field of Classification Search
CPC ...... H04L 9/085; H04L 9/0869; G06F 21/602
See application file for complete search history.

(56) References Cited

U.S. PATENT DOCUMENTS

| | | | | |
|---|---|---|---|---|
| 9,521,194 | B1 * | 12/2016 | Gabrielson | G06F 11/14 |
| 2006/0230081 | A1 * | 10/2006 | Craswell | G06F 11/1448 |
| 2012/0163590 | A1 * | 6/2012 | Lieber | H04L 9/302 |
| | | | | 380/44 |
| 2013/0177157 | A1 * | 7/2013 | Li | H04L 9/08 |
| | | | | 380/277 |
| 2017/0099140 | A1 * | 4/2017 | Hoy | H04L 9/3234 |
| 2018/0176222 | A1 * | 6/2018 | Bhaskar | H04L 63/0815 |
| 2019/0068368 | A1 * | 2/2019 | Moriyama | H04L 9/0866 |
| 2019/0104121 | A1 * | 4/2019 | Khandani | H04L 9/0891 |
| 2019/0356475 | A1 * | 11/2019 | Resch | H04L 9/008 |

* cited by examiner

*Primary Examiner* — Meng Li

(57) ABSTRACT

A system, a method and a computer program product and a system, for Key Fragment Management (KFM). The KFM system comprises a plurality of KFM instances and a client device. At least two KFM instances are executed on execution platforms of two different service providers. Each KFM instance retains a root key fragment. The client device is configured to perform a cryptographic process relating to a data item using a data-specific key. Each KFM instance is configured to generate a data-specific key fragment based on a data identifier of the data item and based on the root key fragment in response to the client device requesting to generate the data-specific key for the data item. The data-specific key is generated based on a plurality of data-specific key fragments generated by the each KFM instances.

13 Claims, 9 Drawing Sheets

SYSTEM AND METHOD FOR CRYPTOGRAPHIC KEY FRAGMENTS MANAGEMENT

CROSS REFERENCE TO RELATED APPLICATIONS

The present invention is based upon and claims benefit of priority filing date of U.S. Provisional patent application Ser. No. 62/696,472 filed Jul. 11, 2018 for "CRYPTOGRAPHIC KEY FRAGMENTS MANAGEMENT", which is hereby incorporated by reference in its entirety without giving rise to disavowment.

TECHNICAL FIELD

The present disclosure relates to cryptographic key management in general, and to cryptographic key fragments management, in particular.

BACKGROUND

Cryptographic key management includes dealing with the generation, exchange, storage, use, crypto-shredding (destruction) and replacement of cryptographic keys. It includes cryptographic protocol design, key servers, user procedures, and other relevant protocols.

Successful key management is critical to the security of a cryptosystem. It is the more challenging side of cryptography in a sense that it involves aspects of social engineering such as system policy, user training, organizational and departmental interactions, and coordination between all of these elements, in contrast to pure mathematical practices that can be automated.

BRIEF SUMMARY

One exemplary embodiment of the disclosed subject matter is a method comprising: obtaining a data identifier of a data item; transmitting the data identifier to a plurality of Key Fragment Management (KFM) instances, wherein each KFM instance retains a root key fragment, wherein each KFM instance is configured to generate a data-specific key fragment based on the data identifier and based on the root key fragment; obtaining from the plurality of KFM instances, a plurality of data-specific key fragments; generating a data-specific key based on the plurality of data-specific key fragments; and performing a cryptographic process relating to the data item using the data-specific key.

Optionally, the cryptographic process may be an encryption of the data item using the data-specific key to provide an encrypted data item.

Optionally, the method may further comprise storing the encrypted data item and storing the data identifier in a manner allowing retrieval thereof for the encrypted data item.

Optionally, the cryptographic process may be a decryption of an encrypted data item using the data-specific key to obtain the data item.

Optionally, said obtaining the data identifier may comprise generating a non-deterministic data identifier.

Optionally, at least two KFM instance may be provided by two different service providers.

Optionally, the method may further comprise: obtaining, in a local environment, a user key fragment, wherein said generating the data-specific key is performed in the local environment and based on the plurality of data-specific key fragments and based on the user key fragment.

Optionally, said obtaining the data identifier may comprise applying a hash function on the data item.

Optionally, each KFM instance may be configured to generate the data-specific key fragment by: deriving, using the data identifier and the root key fragment, a pseudo-identifier, whereby obtaining a plurality of pseudo-identifiers from the plurality of KFM instances; and deriving, using the pseudo-identifier and the root key fragment, the data-specific key fragment.

Optionally, the cryptographic process may be an encryption of the data item using the data-specific key to provide an encrypted data item; and wherein the method further comprises storing the encrypted data item and storing the plurality of pseudo-identifiers in a manner allowing retrieval thereof for the encrypted data item.

Optionally, the cryptographic process may be a decryption of an encrypted data item using the data-specific key to obtain the data item; and wherein said obtaining the data identifier comprises retrieving the plurality of pseudo-identifiers for the encrypted data item; wherein said transmitting comprises transmitting the plurality of pseudo-identifiers to the plurality of KFM instances, wherein each KFM instance is configured to generate the data-specific key fragment based on the pseudo-identifier and based on the root key fragment using a single derivation process.

Optionally, each KFM instance may be configured to generate at least a portion of a respective root key fragment independently.

Optionally, each KFM instance may be configured to generate a respective root key fragment using a random function.

Optionally, a root key that is an aggregation of the root key fragments may never be assembled.

Optionally, each root key fragment comprises a static key fragment and an ephemeral key fragment, wherein a root key is an aggregation of the static key fragments and ephemeral key fragments; wherein the method may further comprise updating at least a portion of the ephemeral key fragments of the KFM instances without modifying the root key.

Another exemplary embodiment of the disclosed subject matter is a KFM system comprising: a plurality of KFM instances, wherein at least two KFM instances are executed on execution platforms of two different service providers, wherein each KFM instance retains a root key fragment; a client device, wherein said client device is configured to perform a cryptographic process relating to a data item using a data-specific key; and wherein each KFM instance is configured to generate a data-specific key fragment based on a data identifier of the data item and based on the root key fragment in response to said client device requesting to generate the data-specific key for the data item, wherein the data-specific key is generated based on a plurality of data-specific key fragments generated by the each KFM instances.

Yet another exemplary embodiment of the disclosed subject matter is a computer program product comprising a non-transitory computer readable storage medium retaining program instructions, which program instructions when read by a processor, cause the processor to perform a method comprising: obtaining a data identifier of a data item; transmitting the data identifier to a plurality of KFM instances, wherein each KFM instance retains a root key fragment, wherein each KFM instance is configured to generate a data-specific key fragment based on the data identifier and based on the root key fragment; obtaining from the plurality of KFM instances, a plurality of data-specific key fragments; generating a data-specific key based on the plurality of data-specific key fragments; and performing a cryptographic process relating to the data item using the data-specific key.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
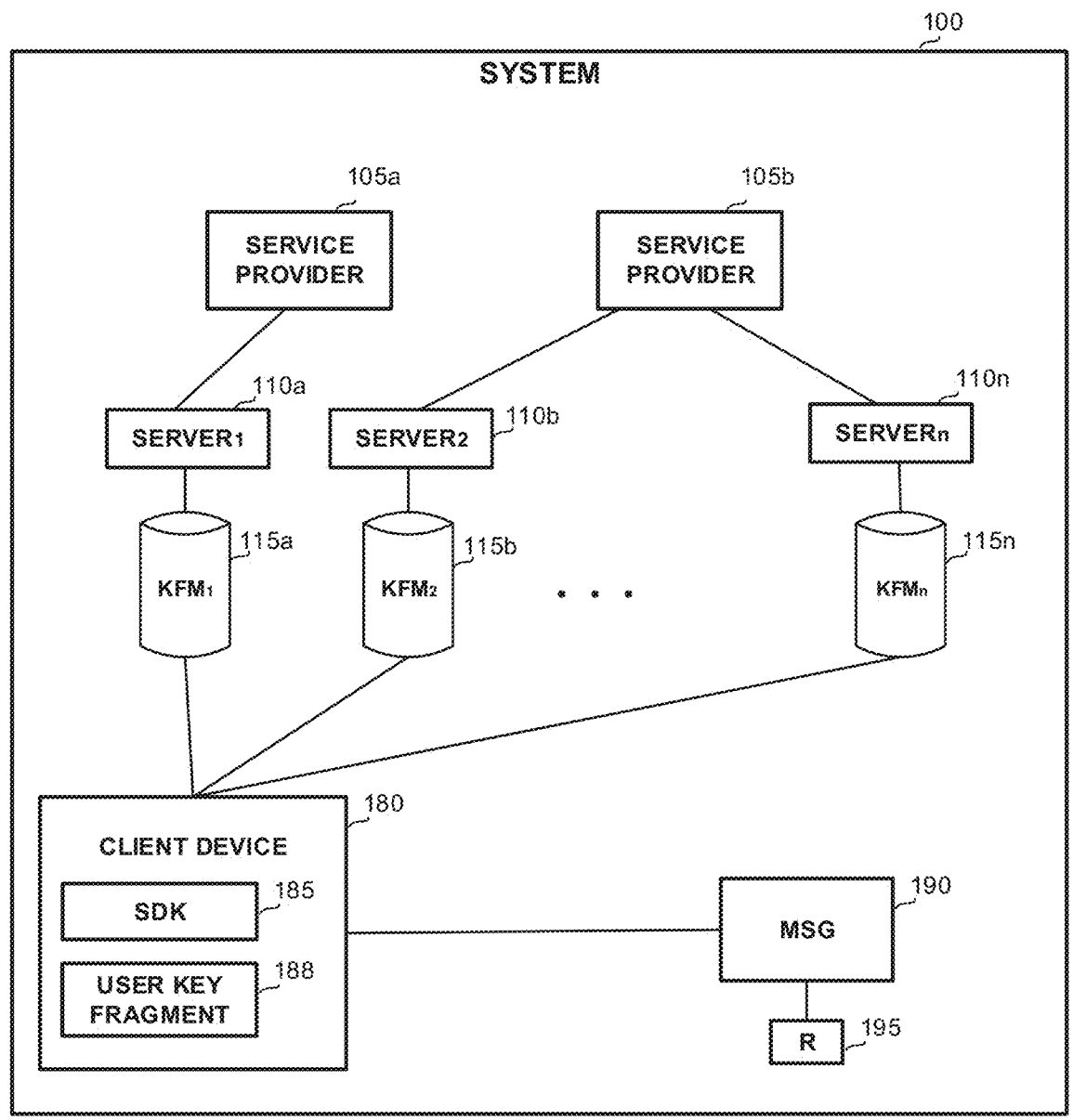
FIG. 1 shows a block diagram of a system, in accordance with some exemplary embodiments of the disclosed subject matter.

One technical problem dealt with by the disclosed subject matter is to provide an architecture for Cryptographic Key Management Service, which offers an absolute split of keys so that the key will never exist in one place, thereby completely preventing any part of the system from being a single point of failure.

In some exemplary embodiments, an encryption key is represented by a plurality of key fragments. Each key fragment may be stored in a different location, when there is no need to consolidate the key fragments for the encryption/decryption process.

In some exemplary embodiments, cryptographic key management services may be based on creating a one or more dedicated virtual machines in which a master key is stored. The master key may be stored only in the memory of the virtual machine, preventing access to unauthorized users. The master key may be configured to never leave the virtual machine. Access to the master key may be restricted only to users having permission. In order to recover the master key, such as in an event of a malfunction of the virtual machine, an encrypted version of the master key may be stored in a different dedicated system. A key used to encrypt master keys may be stored in a protected place to prevent the enclosure of all the master keys stored on the dedicated system. In such a case, when encrypting data, the client may generate an encryption key, encrypt the data using the key, and send the key to the virtual machine that holds the master key. The key may then be encrypted by the master key and returned in an encrypted version to the client. The client may store the encrypted data along with the encrypted key. When decrypting the data, the client may retrieve the encrypted key from the stored data, send the encrypted key to the virtual machine that holds the master key, to obtain the decrypted version thereof. The client may then decrypt the encrypted data using the key.

Another technical problem may be to provide a Key Management System (KMS) or Key Management as a Service (KMAAS), using reduced amount of resources. In some exemplary embodiments, for security reasons, a different dedicated machine may be required to be created for each master key created for a client to store the value of the key. This may result in significantly increasing the cost and complexity of the system.

As yet another technical problem dealt with by the disclosed subject matter is to avoid a single point of failure (SPOF) of cryptographic key management systems. In terms of the security of keys, there may be a single point of failure in naïve systems that may result in stopping the entire system. Since the values of the keys exist in plaintext in the memory of those virtual machines, the ability to access only one of them will reveal the value of the key.

As yet another technical problem dealt with by the disclosed subject matter is to prevent access to the master key from the supplier of the KMS, KMAAS, or other third parties, such as providers of the cloud-computing platform upon which the system is executed (e.g., AWS™). In the naïve solution, since the plaintext of the master keys is stored within the virtual machines provided by the supplier of the systems, the supplier may have a full access to the client's encryption keys. Such may be dangerous and undesirable by the clients.

One technical solution is a distributed KFM system. The KFM system may be configured to generate secure random strong encryption keys, manage data storage for key fragments, and perform a key fragment derivation function, which generates a derived fragment from an original key fragment. The KFM system may comprise a plurality of instances of a KFM service. Each KFM instance may be isolated from other KFM instances. In some exemplary embodiments, each KFM instance may be configured to generate a data-specific key fragments. The plurality of data-specific key fragments may be utilized to generating a data-specific key to be utilized for performing a cryptographic process relating to a data item (e.g., encryption of the data item using the data-specific key to provide an encrypted data item, or decryption of an encrypted data item using the data-specific key to obtain the data item). It may be noted that a root key that is an aggregation of the data-specific key fragments may never be assembled.

In some exemplary embodiments, each KFM instance may be implemented by a cluster of servers each of which may be provided by a different service provider. It may be appreciated that at least two KFM instance may be provided by two different service providers. In some exemplary embodiments, each service provider, such as a cloud-computing platform, may be used for providing servers implementing at most N−1 out of N KFM instances. In some exemplary embodiments, each service provider $P_i$ may be used to provide m KFM instances $KFM_1^i \ldots KFM_m^i$, where m≤N. Additionally, or alternatively, given two providers $P_i$, $P_j$, at least one $KFM_k^i$ that may be implemented using a server provided by $P_i$ and not provided by $P_j$, and at least one $KFM_1^j$ may be implemented using a server provided by $P_j$ and not provided by $P_i$. In some exemplary embodiments, given N KFM instances, each KFM instance may be implemented using a cluster of servers provided using M−1 providers out of M providers that are being used by the system, and for each KFM instance.

It may be appreciated that each KFM instance may be configured to generate a root key fragment independently. As an example, each KFM instance may be configured to generate a respective root key fragment using a random function. A root key that is an aggregation of the root key fragments may never be assembled.

In some exemplary embodiments, a client device may send a request to generate a data-specific key for a certain data item. The request may comprise a data identifier that may be provided to the plurality of KFM instances and may be utilized as an identifier of the data. Each KFM instance be configured to generate the data-specific key fragment based on a data identifier associated with the data item to be encrypted/decrypted and based on a root key fragment retained by the plurality of KFM instance. As an example, the data identifier may be a random byte array.

In some exemplary embodiments, the data-specific key may be a combination of the plurality of data-specific key fragments generated by the plurality of KFM instances. As an example, the data-specific key may be created by applying a XOR operation on all data-specific key fragments. However, it may be noted that other computations may be used to assemble the data-specific key based on the key fragments, such as but not limited to concatenation, multiplication, or the like. It may be noted that the client may not have access to the root key fragments as units. As an example, given N KFM instances, each may generate one root key fragment f, the root key K may be: $K = f_1 \oplus f_2 \oplus \ldots \oplus f_n$. The client may receive the data-specific fragments $f'_1 \ldots f'_n$ and assemble the data-specific key K', but not $f_1 \ldots f_n$. In some exemplary embodiments, in order to retrieve the root key, all of the plurality of KFM instances may need to be accessed to retrieve all root key fragments. It may be noted that, throughout the generation process, the root key may never exist in one place.

In some exemplary embodiments, when encrypting the data item using the data-specific key to provide an encrypted data item, the encrypted data item may be stored along with the data identifier in a manner allowing retrieval thereof for the encrypted data item. Additionally or alternatively, when decrypting an encrypted data item using the data-specific key to obtain the data item, the data identifier may be retrieved in order to determine the data-specific key, to be utilized for the decryption.

It may be appreciated that the encryption may prevent anyone, including the Operating System, from gaining access to that data item, unless it was implicitly requested by an authorized user. Any data item may remain encrypted also when it is copied to an external device, such as a USB, sent out via email or uploaded to the cloud.

Another technical solution may be to perform the cryptographic process in a non-deterministic manner. In some exemplary embodiments, the cryptographic process may be performed using deterministic encryption and non-deterministic encryption. In some exemplary embodiments, non-deterministic encryption may provide for an improved security comparing with deterministic encryption. In some exemplary embodiments, The KFM system may be configured to generate a non-deterministic data identifier of the data item that the cryptographic process is being performed thereon.

In some exemplary embodiments, in non-deterministic encryption, the client device may generate a data identifier, such as random byte array, a random number, or the like. The client may be configured to send a derivation request to the plurality of KFM instances that comprises an identifier of the root key to be utilized for the encryption and the data identifier. Each KFM instance may be configured to retrieve the relevant root key identifier from a database thereof. Each KFM instance may then create the data-specific key fragment based on the data identifier and the root key fragment. In some exemplary embodiments, each KFM instance may create the data-specific identifier by performing a derivation function on the root key fragment and the data identifier. The derivation function may be, for example, a Key Derivation Function (KDF) algorithm applied on the root key fragment and the data identifier, to derive the data-specific key fragment. KDF function may be configured to derive one or more secret keys from a secret value such as a master key, a password, a passphrase, or the like using a pseudorandom function, such as, but not limited to, Keyed cryptographic hash functions, or the like. In some exemplary embodiments, any KDF function may be used, such as, for example, HMAC-based Extract-and-Expand Key Derivation Function (HKDF) or the like.

In some exemplary embodiments, each KFM instance may send the derived data-specific key fragment to the client. After the client receiving all the derived data-specific key fragments, the client may perform a computation on the plurality of data-specific key fragments to assemble the data-specific key to be used for the encryption.

Additionally or alternatively, an additional layer of protection may be added on the client device for generating the data-specific key. The client device may obtain a user key fragment, such as a password. The user key fragment may be obtained in a local environment of the client device. The user key fragment may not be available to any of the KFM instances and may not be known the system vendor. The data-specific key may be assembled in the local environment based on the plurality of data-specific key fragments and based on the user key fragment. As an example, the data-specific key may be assembled by applying a XOR operation on all data-specific key fragments and the user key fragment. As another example, the user key fragment may be treated as an additional key fragment, and may be utilized to derive a user data-specific key by applying a KDF algorithm on the user key fragment and the data identifier, to derive the user data-specific key fragment. As another example, the data-specific key may be assembled by applying a XOR operation on all data-specific key fragments and the user data-specific key fragment, It may be noted that, as the KFM system vendor may not be privy to the user key fragment, the system vendor may be unable to generate the final derived data-specific key without the client's assistance. In some exemplary embodiments, the user of the client may utilize a user key fragment known only to her.

In some exemplary embodiments, the system vendor may provide software code, such as library function, Software Development Kit, or the like, that is used to compute the final data-specific key based on the user key fragment and the data-specific key fragments. In order to prevent the vendor from sending the user key fragment, the software code may be provided in source code, illustrating to the user that the user key fragment is never passed on. Additionally, or alternatively, the software code may be compiled and the outcome binary may be used on the client device. As the compilation is performed by someone else other than the vendor, the client can be certain that the user key fragment is not transmitted elsewhere. In some exemplary embodiments, the client may use code for obtaining the data-specific key that was developed by the user herself or another developer that has no connection with the vendor.

In some exemplary embodiments, the data may be encrypted in the local environment using the final data-specific key by a nondeterministic encryption algorithm, such as for example, AES-GCM, to obtain a ciphertext. The ciphertext may be stored by the client, together with the data identifier. As can be appreciated, throughout this encryption process, the root key never assembled and never exists in one place.

Additionally or alternatively, a nondeterministic data decryption may be performed in a similar manner. The client may retrieve the data identifier, that may be stored together with the encrypted data. The data-specific key may then be generated as in the nondeterministic data encryption and may be utilized to decrypt the encrypted data. It may be noted that throughout the decryption process, the root key never exists in one place.

Yet, another technical solution may be to perform the cryptographic process in a deterministic manner. In some exemplary embodiments, in order to perform a deterministic encryption, the data identifier may be determined by applying a hash function on the data item to be encrypted.

In some exemplary embodiments, each KFM instance may be configured to derive a pseudo-identifier using the data identifier and the root key fragment. Each KFM instance may generate the data-specific key fragment using the pseudo-identifier and the root key fragment. The encryption process may be performed similarly to the non-deterministic case. However, the encrypted data item may be stored with all the pseudo-identifiers, and not with the data identifier.

In some exemplary embodiments, in order to perform a deterministic decryption of an encrypted data item using the data-specific key to obtain the data item, the plurality of pseudo-identifiers for the encrypted data item may be retrieved. The data identifier may then be determined by the KFM instances based on the plurality of pseudo-identifiers. Additionally or alternatively, each KFM instance may be configured to generate the data-specific key fragment based on the pseudo-identifier and based on the root key fragment using a single derivation process.

Yet, another technical solution may be to utilize a refreshable KFM system. In some exemplary embodiments, the refreshable KFM system may be an improvement over the KFM system, such that the values of the root key fragments may be constantly refreshed without changing the actual value of the generated data-specific keys. The advantage of refreshable KFM may be that when an attacker tries to expose the root key, the attacker must obtain all key fragments at the same time, since the key fragments are constantly refreshed.

In some exemplary embodiments, each root key fragment of a refreshable root key may comprise a static value and an ephemeral value. When a new refreshable root key is generated, each KFM instance may be configured to generate two random values of static value and an ephemeral value. It may be appreciated that there may be no dependence between the fragments values that each instance generates. The final refreshable root key may be a combination of all the generated static and ephemeral values from all of the plurality of KFM instances. The plurality of ephemeral values may be periodically and simultaneously updated. However, the root key may never be changed. The root key may be preserved by aggregation of the updated values, based on an invariant property of the ephemeral values. As an example, the root key may be derived by summing all the root key fragments. The sum of the plurality of ephemeral values may be equal to any random number X.

When a refreshable root key is refreshed, the values of the key fragments will change, but the value of the root key itself will remain the same, as the static fragments are not changed, and the sum of the ephemeral fragments is kept equal to the original random number (X). As a result, the only way to retrieve the refreshable root key is by accessing all the KFM instances and retrieving all its fragments simultaneously in order to guarantee that the ephemeral fragments are generated in a single refreshing process yielding to a sum thereof equal to the original random number (X). As another example, the aggregation of ephemeral fragments may always yield a same value. In some cases, the invariant aggregated value may be a random value that was generated originally. Additionally or alternatively, the invariant aggregated value may be a predetermined number, such as zero, one, fifty five, or the like.

In some exemplary embodiments, an end-to-end application security may be implemented using the disclosed subject matter. Any data item that the user uploads to any system may be encrypted using a unique key. An SDK implementing such functionality and enabling a mobile application ("app") to provide app-level encryption may be provided.

One technical effect of utilizing the disclosed subject matter is to provide for a KFM service that offers an absolute split of key fragments so that the key may never exist in one place. The key may never exist in one place, not even when the key is generated or when it is used for the encryption/decryption operations. In the disclosed system, an encryption key may be represented by many key fragments that each one of them is stored in a different location, when there is no need to consolidate the key fragments for the encryption/decryption process. This enable completely preventing any part of the system from being a single point of failure.

Another technical effect of utilizing the disclosed subject matter is to provide for both deterministic and non-deterministic cryptographic process. The non-deterministic encryption may be more secure, while the advantage of deterministic encryption is that it enables to perform searches on the encrypted values. The disclosed KFM system, enables to perform both deterministic and non-deterministic operations in a completely secured manner.

Yet another technical effect of utilizing the disclosed subject matter is to reduce expenses and maintenance, with a much higher security level than the naïve system. In some exemplary embodiments of the disclosed subject matter, the number of virtual machines required may be constant, small and may not depend on the number of keys stored in the system. As a result, the key management framework may scale significantly better than the naïve approach, while utilizing a minimal number if virtual machines. Additionally or alternatively, it may be noted that the number of virtual machines (the KFM instances) that must be hacked in order to expose the keys is known and managed when building the system. As a result, the user can increase the security level for sensitive information by increasing the number of KFM instances.

Yet another technical effect of utilizing the disclosed subject matter is to provide for a stronger security of the cryptographic key management service. In some exemplary embodiments, the system may be implemented using a configurable number of virtual machines (implementing the KFM instances). Security level may be increased as in order to expose the keys, each KFM may need to be hacked or otherwise compromised. In some exemplary embodiments, the values of keys managed in the system cannot be accessed by the system's suppliers, as the client may perform an additional derivation function on the final derived key based on a user key fragment, such as password known only to its user. If the client utilizes the user key fragment that is not stored on the KFMs, the client device must also be compromised in order to expose the key. Additionally or alternatively, when utilizing the refreshable KFM system, to expose the root key, an attacker must obtain all key fragments at the same time, since the key fragments are constantly refreshed.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a block diagram of a system, in accordance with some exemplary embodiments of the disclosed subject matter.

In some exemplary embodiments, a System 100 may be a KFM system. System 100 may comprise a plurality of KFM Instances 115a-115n. Each KFM instance may be executed by an execution platform, such as Servers 110a-110n. It may be appreciated that at least two KFM instances 115a and 115b are executed on execution platforms 110a and 110b of two different service providers 105a and 105b.

In some exemplary embodiments, each KFM instance (115a-115n) may retain a root key fragment. A root key may be generated as an aggregation of the root key fragments of KFM Instances 115a-115n. Such root key may never be assembled within any portion of System 100. to generate a new root key, a client device, such as 180, may send a generate key request with a unique key name to all of KFM Instances 115a-115n. Each KFM instance of KFM Instances 115a-115n may generate a new random root key fragment and store it in its database along with the supplied key name. It may be noted that there may be no dependence between the root key fragments that each instance generates. The value generated in the KFM instances may be different, but the name supplied by the client may be identical in each KFM instance. Each KFM instance may be configured to sends back to the client only a confirmation that the key fragment was created. The only way to retrieve the root key is by accessing all the KFM instances 115a-115n and retrieving all the root key fragments. Throughout this generation process, the root key never exists in one place.

In some exemplary embodiments, System 100 may comprise a Client Device 180. Client Device 180 may be configured to perform a cryptographic process relating to a data item, such as Message 190 using a data-specific key.

In some exemplary embodiments, Client Device 180 may request from KFM Instances 115a-115n to generate the data-specific key for the cryptographic process. Each KFM instance of KFM Instances 115a-115n may be configured to generate a data-specific key fragment based on a data identifier of the data item (such as R 195 of Message 190) and based on the root key fragment retained be each of KFM Instances 115a-115n. In some exemplary embodiments, data identifier may be a deterministic data identifier, a non-deterministic data identifier, or the like.

In some exemplary embodiments, the vendor of System 100 may provide a Software Development Kit (SDK) 180 that is used to compute the data-specific key. SDK 180 may comprise software code, library functions, or the like. In order to prevent the vendor from sending sensitive information, such as the data-specific key, User Key Fragment 188, or the like, SDK 185 may be provided in source code. SDK 185 may be configured to illustrate to the user that the data-specific key or User Key Fragment 188 may never be passed on. Additionally, or alternatively, the software code may be compiled and the outcome binary may be used on the client device as SDK 185. As the compilation is performed by someone else other than the vendor of System 100, the client can be certain that the data-specific key or User Key Fragment 188 may not be transmitted elsewhere. In some exemplary embodiments, Client Device 180 may use code for obtaining the data-specific key fragments that was developed by the user herself or another developer that has no connection with the vendor.

In some exemplary embodiments, the data-specific key may be generated based on a plurality of data-specific key fragments generated by KFM Instances 115a-115n. As an example, the data-specific key may be derived by applying an operation on the data-specific key fragments, such as but not limited to KDF algorithm on the key fragment and the data identifier, to derive the data-specific key fragment, or the like.

Additionally or alternatively, the data-specific key may be generated in a local environment of Client Device 180. The local environment may not accessible from KFM Instances 115a-115n. The data specific key may be generated based on the plurality of data-specific key fragments and based on a User Key Fragment 188 obtained by Client Device 180. In some exemplary embodiments, as the vendor of System 100 may not privy to User Key Fragment 188, the vendor may be unable to generate the final data-specific key without the assistance of Client Device 180 or a user thereof (not shown). In some exemplary embodiments, SDK 185 may be configured to generate the data-specific key based on User Key Fragment 188 and based on the plurality of data-specific key fragments obtained from KFM Instances 115a-115n.

In some exemplary embodiments, each KFM instance of KFM Instances 115a-115n may be configured to generate at least a portion of a respective root key fragment independently. It may be appreciated that a root key that is an aggregation of the root key fragments may never be assembled within any portion of System 100. System 100 may be configured to refresh the root key fragments in at least a portion of KFM Instances 115a-115n without modifying the root key.

In some exemplary embodiments, Client Device or an additional device similar thereto, may serve as an Encryption-WALL. Encryption-WALL may be deployed in between an internal organization environment and the public cloud. The Encryption-WALL may be able to encrypt any data item (text, video, files) that is stored in any SaaS provider (ex. Salesforce™) or Cloud Storage provider (ex. OneDrive™, Dropbox™ etc.). In some exemplary embodiments, Encryption-WALL may seamlessly encrypt email attachments such as Message 190. In some exemplary embodiments, email attachments may be encrypted for emails transmitted to external recipients, and not for emails transmitted only to internal recipients.

Additionally or alternatively, SDK 185 may be utilized to implement an end-to-end application security. Any data item such as Message 190, that the user uploads to any system may be encrypted using a unique key. SDK 185 may be utilized to implement such functionality and enable mobile application ("app") to provide app-level encryption may be provided.

Additionally or alternatively, SDK 185 may be utilized to implement an API Gateway to enable organizations to share various types of data items with their partners in order to support mutual business processes. When connecting the API Gateway technology with an Encryption Key Management technology of the disclosed subject matter, a potential organization may be able to ensure that any data item (e.g. Message 190) that passes through that gateway will be visible (decrypted) only by the true recipients of that data. The disclosed subject matter may be utilized to create a key for each partner and the files requested for sharing may be encrypted with it on the owner's side and stored in a place that the partner has access to. In addition, the partner may be given access to the key, so she may be able to decrypt the intended files on his side.

It may be noted that the encryption/decryption provided by System 100 may be deterministic or non-deterministic encryption. The advantage of non-deterministic encryption that it may be more secure, while the advantage of deterministic encryption is that it may enable performing searches on the encrypted values. Via System 100, the two operations can be performed in a completely secured manner.

Figure 2A:
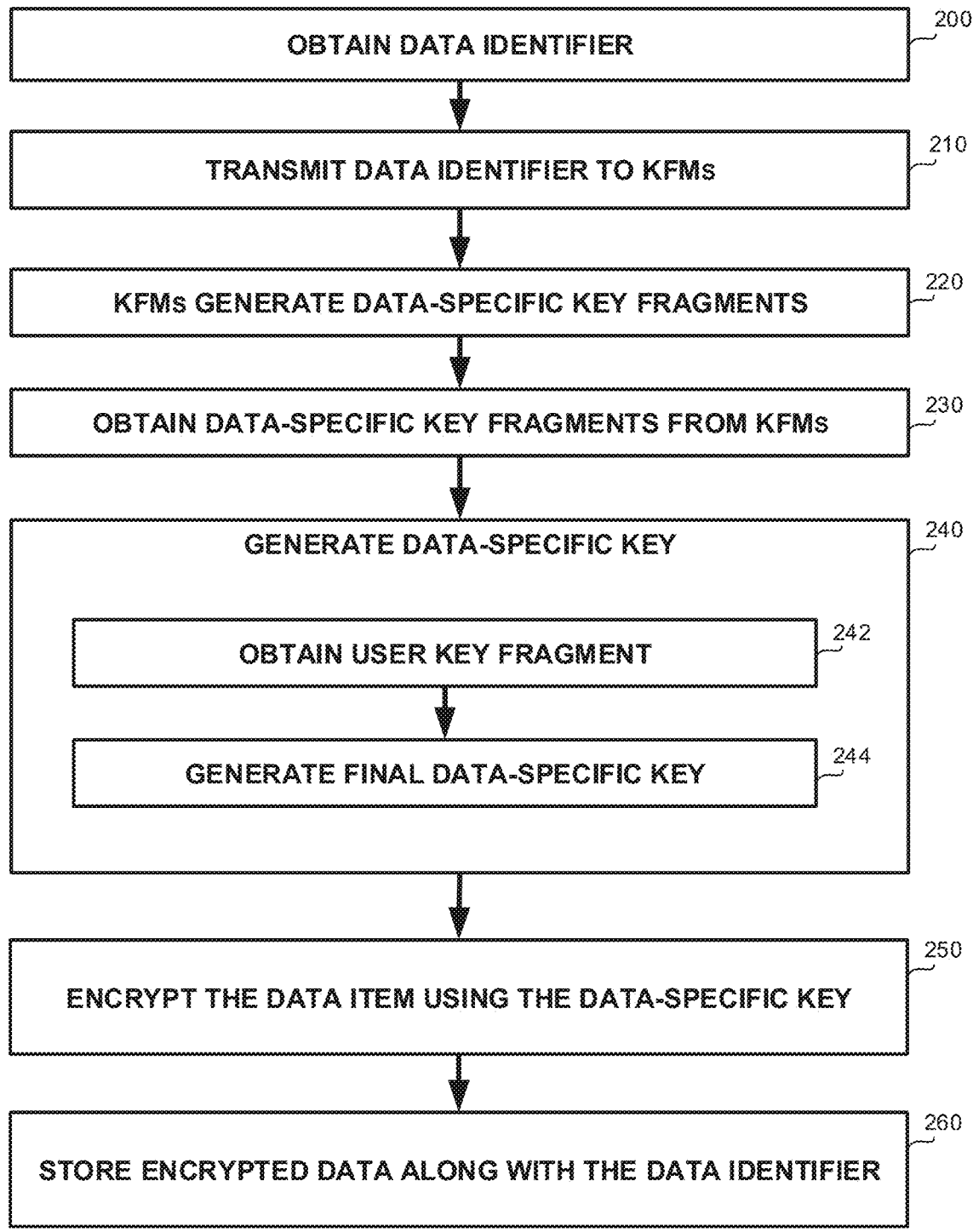
FIGS. 2A-2B show flowchart diagrams of a method, in accordance with some exemplary embodiments of the disclosed subject matter.

Referring now to FIG. 2A showing a flowchart diagram of a method for a nondeterministic data encryption, in accordance with some exemplary embodiments of the disclosed subject matter.

On Step 200, a data identifier of a data item may be obtained. In some exemplary embodiments, the data item may be a text, a video, files, or the like. The data item may be stored on laptops, workstations, file servers, or the like. The data identifier may be generated by the party encrypting the data item in order to identify the data item and retrieve the key utilized for the encryption. As an example, the data identifier may be a set of random bytes, a name of a file, or the like. Additionally or alternatively, for security reasons, and to ensure that each data item is encrypted using a different data-specific key, it may be necessary to generate an identifier in a random manner based on cryptographically secure pseudorandom number generator.

On Step 210, the data identifier may be transmitted to a plurality of KFM instances, such as 115-135 of FIG. 1.

In some exemplary embodiments, each KFM instance may retain a root key fragment. The root key fragment may be generated based on a key identifier utilized by the KFM instance to identify the key being generated and utilized for the cryptographic process. Additionally or alternatively, the key identifier may be obtained by the client device and transmitted to the plurality of KFM instances with the data identifier, in order to determine which root key is being utilized.

Additionally or alternatively, the root key fragment may be generated in advanced in a key generation process, based on a generate key request from the client. The generate key request may comprise the key identifier that may be provided to the plurality of KFM instances. Each KFM instanced may generate a random root key fragment. The random root key fragment may be stored in a database along with the supplied key identifier. It is noted that each KFM instance may generate a different key and there may be no dependence between the keys that each KFM instance generates. In some exemplary embodiments, the key generated in each KFM represents a fragment of the root key. The root key may be the combination of all the generated root key fragment from all the KFM instances. For example, the final root key may be created by applying a XOR operation or other computations on all key fragments. As another example, the final root key may be a collection of all the key fragments without applying any computation, such as concatenating the key fragments. Each KFM instance may send back to the client a confirmation that the fragment was created, without disclosing the root key fragment itself. In order to retrieve the root key, all the KFM instances may need to be accessed to retrieve all root key fragments. In some exemplary embodiments, throughout the generation process, the root key may never exist in one place.

On Step 220, each KFM instance may be configured to generate a data-specific key fragment based on the data identifier and based on the root key fragment. It may be noted that each KFM instance may generate a different data-specific key fragment and there may be no dependence between the data-specific key fragments that each KFM generates. To generate the data-specific key fragment, each KFM instance may perform a derivation function on the root key fragment and the data identifier. The derivation function may be, for example, a KDF algorithm where the root key fragment F is used as the key and the data identifier R is used as the salt, so that: f=KDF(F,R).

On Step 230, a plurality of data-specific key fragments may be obtained from the plurality of KFM instances. In some exemplary embodiments, each KFM instance may send the data-specific key fragment f to the client for generating the data-specific key.

On Step 240, a data-specific key may be generated based on the plurality of data-specific key fragments. In some exemplary embodiments, each data-specific key fragment may represent a fragment of the data-specific key. The data-specific key may be a combination of all the generated data-specific key fragments from all the KFM instances. As example, the data-specific key may be created by applying a XOR operation on the plurality of data-specific key fragments. Given N instances of KFM, each of which generates one data-specific key fragment $f_i$, the data-specific key K may be: $K=f_1 \oplus f_2 \oplus \ldots \oplus f_n$. However, it may be noted that other computations may be used to create the data-specific key based on the data-specific key fragments, such as but not limited to concatenation, multiplication, summation, or the like.

In some exemplary embodiments, the data-specific key may be generated on the client side. The client device may receive the data-specific keys fragments and may perform a computation to derive the key to be used for the decrypt/encrypt operation. The data-specific key may never be known by the KFM instances. In some exemplary embodiments, in order to retrieve the data-specific key, all the KFM instances may be required to be accessed to retrieve all data-specific key fragments.

Additionally or alternatively, on Step 242, a user key fragment may be obtained. The user key fragment may not be available to any of the KFM instances and not be known the system vendor.

On Step 244, a final data-specific key may be generated based on the plurality of data-specific key fragments and based on the user key fragment. In some exemplary embodiments, the user key fragment may be utilized to derive the final data-specific key to be used for encryption/decryption operation. In some exemplary embodiments, the final data-specific key K' may be computed as K'=KDF(K, user key fragment). In some exemplary embodiments, the derivation function may be the same or different than that used by the KFM instances to derive the data-specific key fragment. Additionally, or alternatively, the derivation of the K' may be obtained differently, such as by applying a XOR function on the user key fragment with the plurality of data-specific key fragments, by applying a KDF algorithm on the user key fragment and the data-specific key, or the like.

On Step 250, the data item may be encrypted using the data-specific key. In some exemplary embodiments, the data item may be encrypted on the client. The data item may be encrypted a nondeterministic encryption algorithm, such as AES-GCM to obtain a ciphertext.

On Step 260, the encrypted data item may be stored by the client together with the data identifier. In some exemplary embodiments, the ciphertext generated on Sep 2350 may be stored as the encrypted data item. The data identifier may be stored with the encrypted data in a manner allowing retrieval thereof for the encrypted data item.

As can be appreciated, throughout this encryption process, the root key may never exist in one place.

Figure 2B:
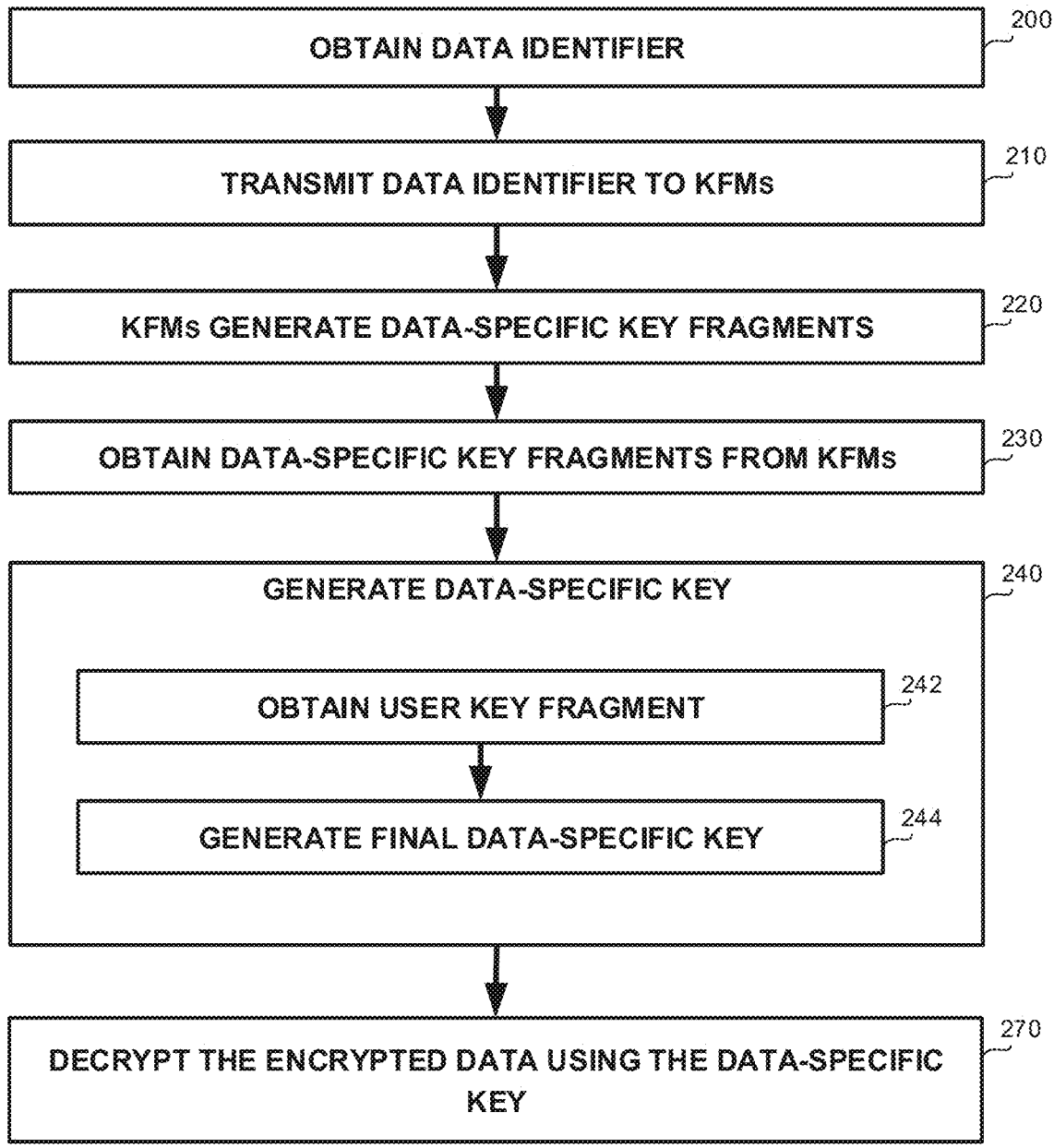

Referring now to FIG. 2B showing a flowchart diagram of a method for a nondeterministic data decryption, in accordance with some exemplary embodiments of the disclosed subject matter.

On Step 200, the data identifier may be obtained. In some exemplary embodiments, the data identifier may be stored with the encrypted data item in a manner allowing retrieval thereof for the encrypted data item.

Steps 210-240 may be performed as described above.

On Step 270, the encrypted data item may be decrypted using the data-specific key. In some exemplary embodiments, the encrypted data item may be decrypted on the client. The data item may be decrypted a nondeterministic decryption algorithm, such as AES-GCM t.

It may be noted that throughout the decryption process, the root key never exists in one place.

Figure 3A:
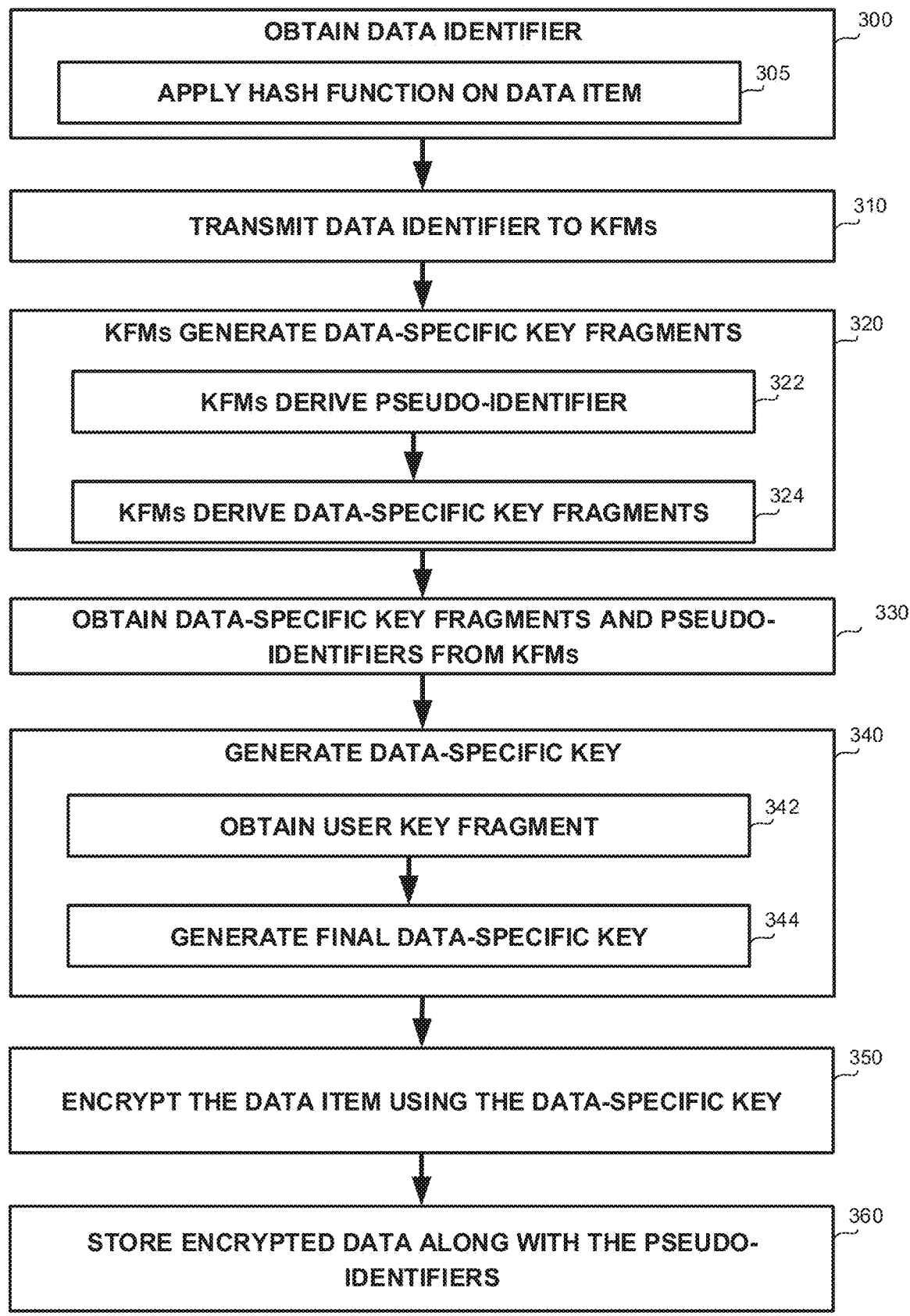
FIGS. 3A-3B show flowchart diagrams of a method, in accordance with some exemplary embodiments of the disclosed subject matter.

Referring now to FIG. 3A showing a flowchart diagram of a method of a deterministic encryption, in accordance with some exemplary embodiments of the disclosed subject matter.

On Step 300, a data identifier of a data item may be obtained by applying a hash function on the data item (Step 305). The data identifier may be obtained by the client device. Additionally or alternatively, given a data item D, the client device may be configured to calculate the SHA-256 cryptographic hash on the data item to be encrypted to obtain the derivation data seed. As an example, the data identifier may be dds=hash(D).

On Step 310, the data identifier may be transmitted to a plurality of KFM instances.

On Step 320, each KFM instance may be configured to generate a data-specific key fragment based on the data identifier and based on the root key fragment. In some exemplary embodiments, each KFM instance may be configured to retrieve the root key fragment from its database. The retrieval may be performed using an identifier of the key supplied in the derivation request.

On Step 322, each KFM instance may be configured to derive a pseudo-identifier based on the data identifier and based on the root key fragment.

In some exemplary embodiments, each KFM instance may be configured to compute the pseudo-identifier. The pseudo-identifier may be computed by applying a derivation function on the root key fragment and on the data identifier. The derivation function may be an KDF algorithm where the root key fragment used as the key and the data identifier is used as the salt, an HMAC algorithm where the root key fragment used as the key and the data identifier is used as the message, or the like. As an example, the pseudo-identifier may be: dd=KDF(F,dds).

On Step 324, the data-specific key fragment may be derived based on the pseudo-identifier and the root key fragment.

In some exemplary embodiments, each KFM instance may be configured to perform a second derivation function on the root key fragment and the pseudo-identifier dd. The derivation function may be an KDF algorithm where the root key fragment used as the key and the pseudo-identifier dd is used as the salt, so that: f'=KFM(F,dd). In some exemplary embodiments, the same KDF algorithm may be used in both steps. Additionally, or alternatively, different algorithms may be used in the different steps, such as different KDF algorithms, different HMAC algorithms, or the like.

On Step 330, a plurality of data-specific key fragments may be obtained from the plurality of KFM instances. In some exemplary embodiments, each KFM instance may be configured to send the data-specific key fragment f' to the client together with the pseudo-identifier dd.

On Step 340, a data-specific key may be generated based on the plurality of data-specific key fragments. In some exemplary embodiments, the client may receive the plurality of data-specific key fragments and perform a computation to create the data-specific key to be used for the decrypt/encrypt operation. The computation may be, for example, performing a XOR operation on all key fragments. As an example, given N number of KFMs, each of which returns a data-specific key fragment f', the data-specific key K' may be: K'=f'1⊕f'2⊕ . . . ⊕f'n.

Additionally or alternatively, on Step 342, a user key fragment may be obtained. The user key fragment may not be available to any of the KFM instances and not be known the system vendor.

On Step 344, a final data-specific key may be generated based on the plurality of data-specific key fragments and based on the user key fragment. In some exemplary embodiments, the client device may obtain a user key fragment not available to any of the KFM instances and not known the system vendor. The user key fragment may be utilized to derive a final data-specific key K" to be used for encryption/decryption. In some exemplary embodiments, the final derived key K" may be computed as K"=KDF(K', user key fragment). In some exemplary embodiments, the derivation function may be the same or different than that used by the KFMs. Additionally, or alternatively, the derivation of the K" may be obtained differently, such as by applying a XOR function on the user key fragment with the plurality of data-specific key fragments.

In some exemplary embodiments, as the system vendor is not privy to the user key fragment, the system vendor is unable to generate the final derived key without the client's assistance. In some exemplary embodiments, the user of the client may utilize a password known only to her.

In some exemplary embodiments, the system vendor may provide software code, such as library function, Software Development Kit, or the like, that is used to compute the final derived key based on the user key fragment and the derived key K'. In order to prevent the vendor from sending the user key fragment, the software code may be provided in source code, illustrating to the user that the user key fragment is never passed on. Additionally, or alternatively, the software code may be compiled and the outcome binary may be used on the client device. As the compilation is performed by someone else other than the vendor, the client can be certain that the user key fragment is not transmitted elsewhere. In some exemplary embodiments, the client may use code for obtaining the final derived key K" that was developed by the user herself or another developer that has no connection with the vendor.

On Step 350, the data item may be encrypted using the data-specific key. In some exemplary embodiments, the data item may be encrypted on the client. The data item may be encrypted using a deterministic encryption algorithm, such as AES-SIV to obtain a ciphertext.

On Step 360, the encrypted data item may be stored by the client together with the plurality of pseudo-identifiers. In some exemplary embodiments, the plurality of pseudo-identifiers may be stored with the encrypted data in a manner allowing retrieval thereof for the encrypted data item.

As can be appreciated, throughout this encryption process, the root key may never exist in one place.

Figure 3B:
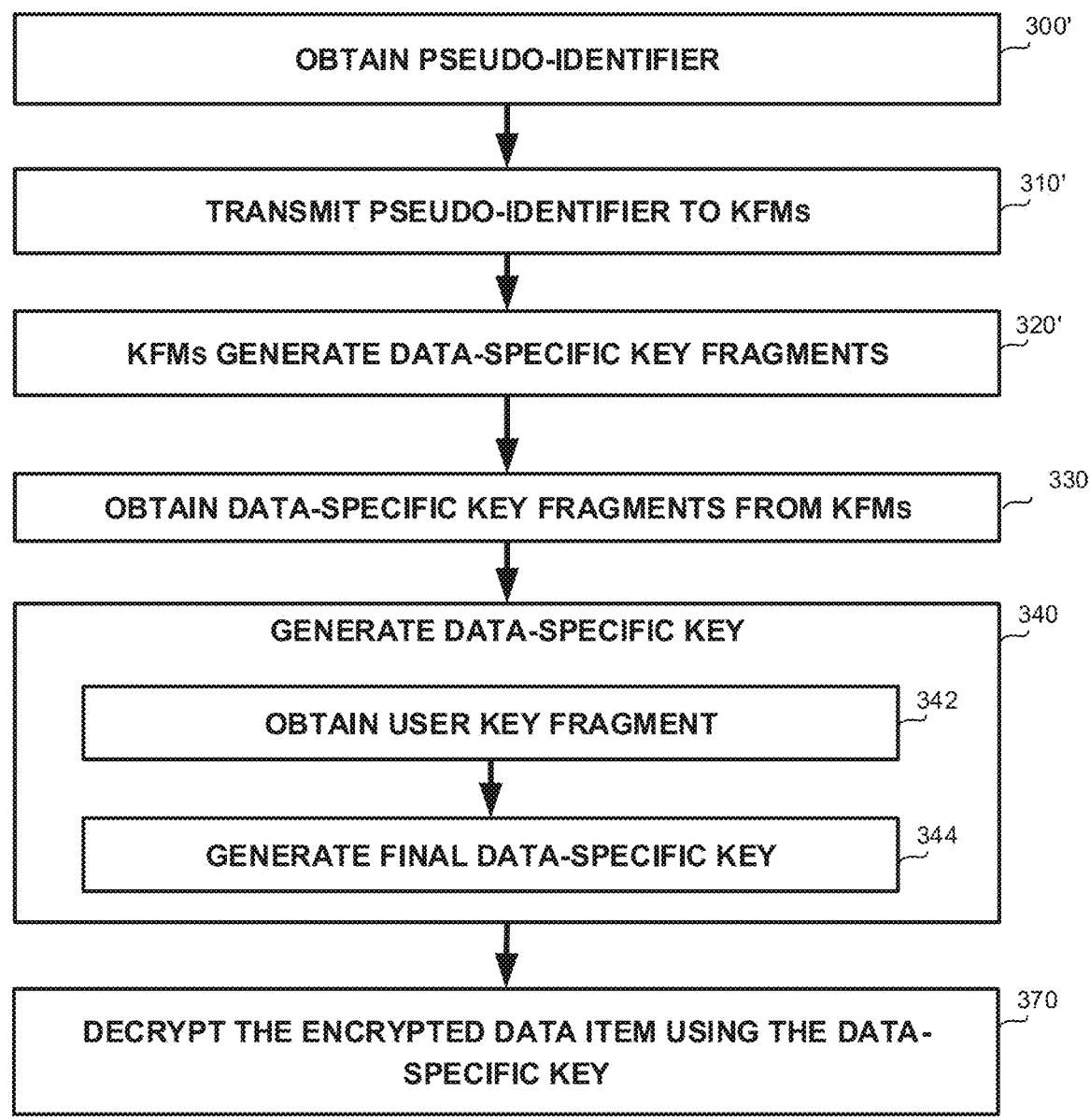

Referring now to FIG. 3B showing a flowchart diagram of a method, in accordance with some exemplary embodiments of the disclosed subject matter. FIG. 3B shows an illustration of a flowchart of a deterministic data decryption, in accordance with some exemplary embodiments of the disclosed subject matter.

On Step 300', a plurality of pseudo-identifiers of an encrypted data item may be obtained. In some exemplary embodiments, the plurality of pseudo-identifiers may be stored together with the encrypted data item, in a manner allowing retrieval thereof for the encrypted data item.

On Step 310, the plurality of pseudo-identifier may be transmitted to a plurality of KFM instances. In some exemplary embodiments, pseudo-identifier may be transmitted to the KFM instance that pseudo-identifier was created therefor.

On Step 320', each KFM instance may be configured to generate a data-specific key fragment based on the pseudo-identifier and based on the root key fragment. In some exemplary embodiments, each KFM instance may be configured to retrieve the root key fragment from its database. The retrieval may be performed using an identifier of the key supplied in the derivation request.

In some exemplary embodiments, each KFM instance may be configured to perform a single derivation function on the root key fragment and the pseudo-identifier dd. The derivation function may be an KDF algorithm where the root key fragment f used as the key and the pseudo-identifier dd is used as the salt, so that: $f'=KDF(f,dd)$.

On Step 330, a plurality of data-specific key fragments may be obtained from the plurality of KFM instances. In some exemplary embodiments, each KFM instance may be configured to send the data-specific key fragment f' to the client.

On Step 340, a data-specific key may be generated based on the plurality of data-specific key fragments. Additionally or alternatively, on Step 342, a user key fragment may be obtained and on Step 344, a final data-specific key may be generated based on the plurality of data-specific key fragments and based on the user key fragment.

On Step 370, the encrypted data item may be decrypted using the data-specific key. In some exemplary embodiments, the data item may be decrypted using a deterministic encryption algorithm, such as AES-SIV to obtain a ciphertext.

As can be appreciated, throughout this decryption process, the root key may never exist in one place.

Figure 4A:
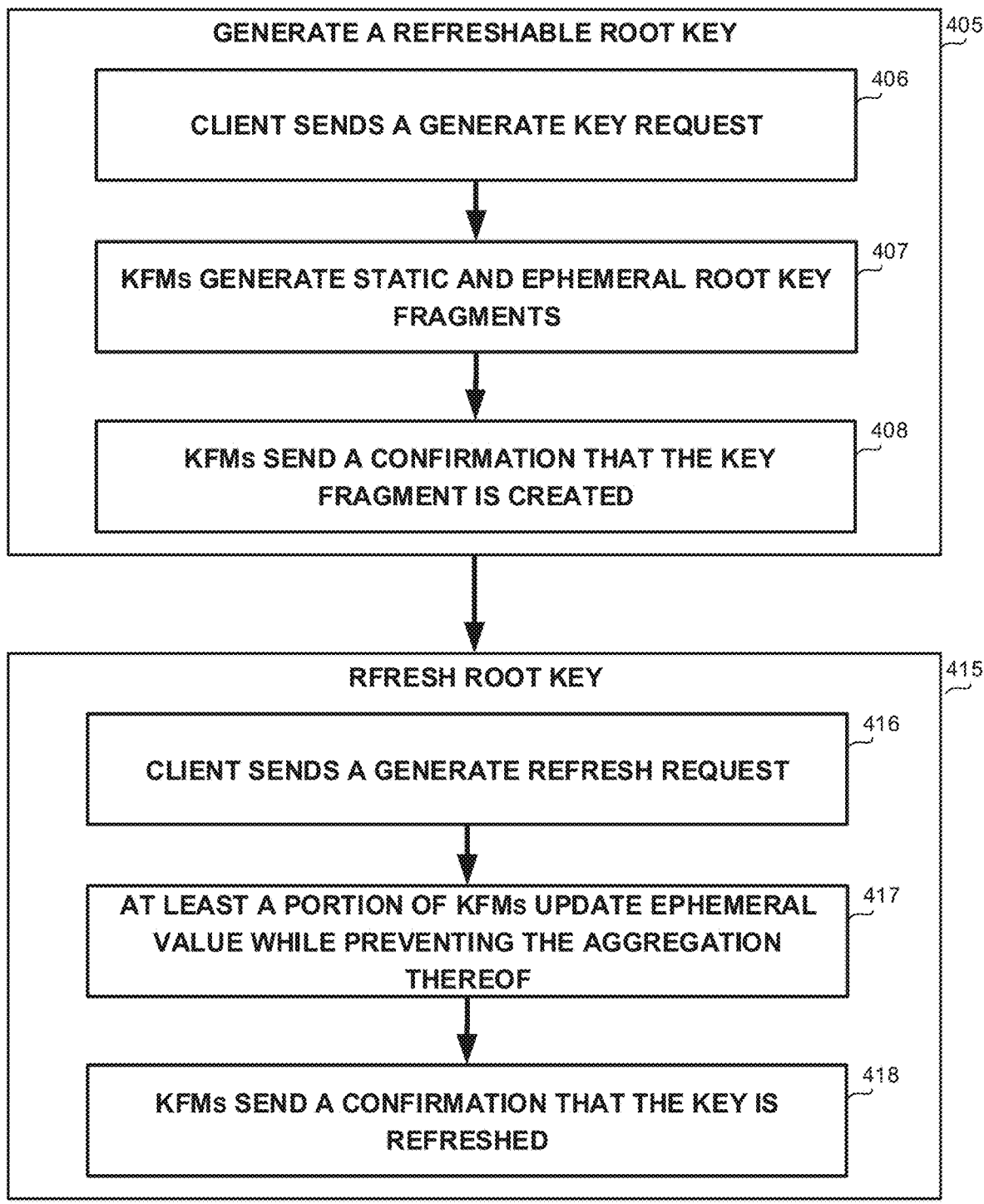
FIGS. 4A-4B show flowchart diagrams of a method, in accordance with some exemplary embodiments of the disclosed subject matter.

Referring now to FIG. 4A showing a flowchart diagram of a method, in accordance with some exemplary embodiments of the disclosed subject matter.

On Step 405, a refreshable root key may be generated. In some exemplary embodiments, the refreshable root key generation process may be as follows:

On Step 406, a client may send a generate key request with a unique key name to a plurality of KFM instances. As an example, the client may be similar to Client Device 180 of FIG. 1, the KFM instances may be similar to 110a-100n of FIG. 1.

On Step 407, each KFM instance may generate a static and ephemeral root key fragments. In some exemplary embodiments, each KFM instance may be configured to generate two random values for static s and ephemeral e root key fragments. Each KFM instance may store the static and ephemeral root key fragments in a database thereof, along with the supplied key name. It may be noted that there may be no dependence between the fragments values that each instance generates. The static and ephemeral values generated in each KFM instance may represents a fragment of the final root key. The values generated in each KFM instance may be different, but the name supplied by the client may be identical in each KFM instance.

In some exemplary embodiments, the final refreshable root key may be a combination of the plurality of static and ephemeral root key fragments from the plurality of KFM instances. Given N instances of KFM and each of which generates a fragment $f=s+e$, the refreshable root key K may be: $K=\Sigma_n^1 f=\Sigma_n^1(s+e)=\Sigma_n^1 s+\Sigma_n^1 e$.

On Step 408, each KFM instance may sends back to the client a confirmation that the key fragment was created.

It may be appreciated that throughout this generation process, the refreshable root key may never exist in a single location. The only way to retrieve the refreshable root key is by accessing all the KFM instances and retrieving all its fragments simultaneously.

On Step 415, the refreshable root key may be refreshed.

In some exemplary embodiments, when a refreshable root key is refreshed, the values of the root key fragments may change, however, the value of the root key itself may remain unchanged. In some exemplary embodiments, the refresh process may be as follows:

On Step 416, the client may send a refresh key request to the plurality of KFM instances to refresh an existing refreshable root key. In some exemplary embodiments, the refresh key request may comprise the unique key name of the requested refreshable root key.

On Step 417, at least a portion of the plurality of each KFM instance may update the value of the ephemeral root key fragment while preserving the aggregation of the plurality of ephemeral root key fragments as invariant. As an example, the values of the ephemeral key fragments, or portion thereof, may be updated such that the total amount of the ephemeral key fragments equals the previous total amount, such that $\Sigma_n^1 e$ may not be changed.

In some exemplary embodiments, each KFM instance, or a portion of the plurality of KFM instances, may be configured to update the value of the ephemeral root key fragment. Updating the portion of ephemeral root key fragments may be performed while keeping an aggregation of the plurality of ephemeral root key fragments not changed. As an example, $e_{new} \neq e_{old}$, but $\Sigma_n^1 e_{new} = \Sigma_n^1 e_{old}$.

In some exemplary embodiments, preserving the invariant of aggregation of the plurality of ephemeral root key fragments may be performed by adding values to at least a portion of the plurality of ephemeral root key fragments, whose aggregation equals the previous sum of the ephemeral values. As an example, N secure random big integers $r_1, r_2 \ldots r_n$ (as the number of the plurality of KFM instances, e.g., the key size) whose total amount equals 0 may be generated, so that $\Sigma_n^1 r=0$. Each $r_i$ may be added to the value of the ephemeral root key fragment retained by the associated KFM instance $e_{new}=e_{old}+r_i$. It may be noted, that some of the random big integers $r_i$ may equal 0, e.g., the associated ephemeral value thereof may be unchanged, however, at least two $r_i$'s may not equal 0. As a result, at least a portion of the root key fragments may receive a new value, since $s+e_{new} \neq s+e_{old}$. However, the value of the root key itself may remain the same, since: $\Sigma_n^1 e_{new} = \Sigma_n^1 e_{old} + \Sigma_n^1 r = \Sigma_n^1 e_{old}$. As a result, the root key may not be modified: $K_{new}=\Sigma_n^1 f_{new}=\Sigma_n^1 s+\Sigma_n^1 e_{new}=\Sigma_n^1 s+\Sigma_n^1 e_{old}=K_{old}$.

On Step 418, each KFM instance may sends back to the client a confirmation that the key fragment was refreshed.

It may be noted that Step 415 may be performed periodically based on a refresh request issued by a client to all the KFM instances. When a root key is refreshed, the values of the key fragments may change, but the value of the root key itself will remain the same. Throughout this refresh process, the refreshable root key never exists in one place.

Figure 4B:
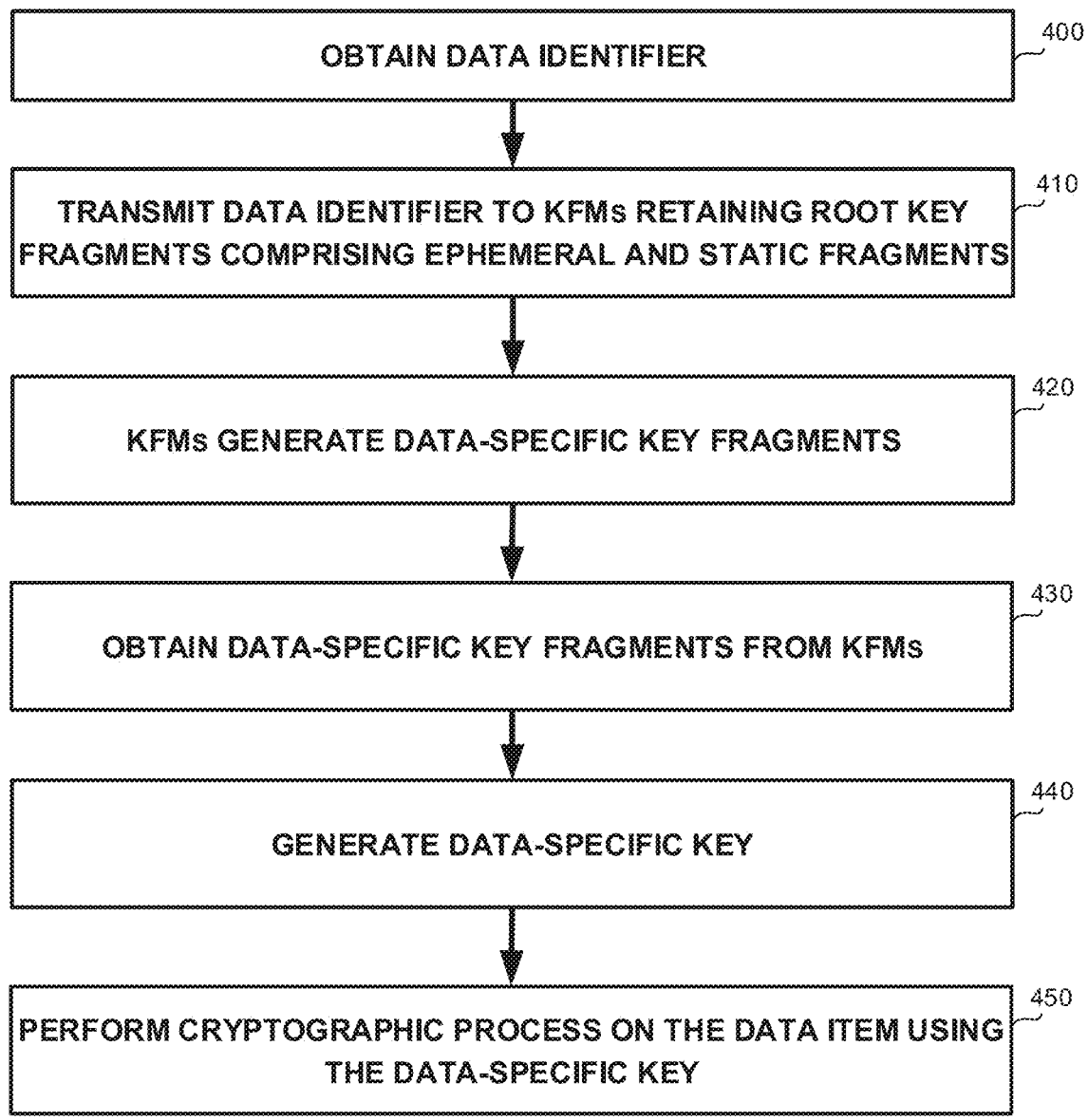

Referring now to FIG. 4B showing a flowchart diagram of a method, in accordance with some exemplary embodiments of the disclosed subject matter.

The method shown in FIG. 4B relates to of a cryptographic process with a refreshable root key. The cryptographic process may be an encryption or a decryption process. The cryptographic process may be deterministic (similar to the method shown in FIGS. 3A-3B) or non-deterministic encryption (similar to the method shown in FIGS. 2A-2B).

On Step 400, a data identifier of a data item may be obtained. Step 400 may be similar to Step 200 of FIGS. 2A-2B, or Step 300 of FIG. 3A, or Step 300' of FIG. 3B.

On Step 410, the data identifier may be transmitted to a plurality of KFM instances, such as 115-135 of FIG. 1. In some exemplary embodiments, each KFM instance may retain a refreshable root key fragment. Each refreshable root key fragment may comprise a static key fragment and an ephemeral key fragment stored in a database thereof along with the supplied key identifier. A root key may be an aggregation of the static key fragments and ephemeral key fragments.

As an example, given N instances of KFM, each of which generates one root key fragment comprising a static key fragment s and an ephemeral key fragment e, f=s+e, the root key K will be: $K=\Sigma_n^1 f=\Sigma_n^1(s+e)=\Sigma_n^1 s+\Sigma_n^1 e$. The only way to retrieve the refreshable root key is by accessing all the KFM instances and retrieving all its fragments simultaneously.

In some exemplary embodiments, at least a portion of the ephemeral root key fragments of the KFM instances may be updated without modifying the root key.

On Step 420, each KFM instance may be configured to generate a data-specific key fragment based on the data identifier and based on the root key fragment. In some exemplary embodiments, each KFM instance may be configured to apply a derivation function on the data identifier and on the static fragment of the root fragment key. As an example, the derivation function may be an KDF algorithm where the static fragment s issued as the key and the data identifier R is used as the salt, so that s'=KDF(s, R). The derived s' result may be connected with the ephemeral fragment value e, so that the derived data-specific key fragment may be: f'=s'+e=KDF(s, R)+e.

In some exemplary embodiments, the data-specific key fragments obtained from the plurality of KFM instances at different time points may be different. As at least a portion of the ephemeral root key fragments of the KFM instances may be periodically updated. However, an aggregation of the data-specific key fragment may be kept the same, as the update of the ephemeral root key fragments is performed without modifying the root key. As a result, an aggregation of the plurality of ephemeral key fragments may be the invariant On Step 430, a plurality of data-specific key fragments may be obtained from the plurality of KFM instances.

On Step 440, a data-specific key may be generated based on the plurality of data-specific key fragments.

In some exemplary embodiments, the client may perform an addition operation between all data-specific key fragments. And additional SHA-256 cryptographic hash function may be applied on the result. The final result from the hash function may be utilized as the data-specific key to be used for the decrypt/encrypt operation. It may be noted that the hash function is used to normalize the derived key size. Thus, from the hash output, the derived key may be the number of bytes required by the length of the key. Referring again to above example, given N instances of KFM, each of which returns a derived key fragment f', the data-specific key K' for the encrypt will be: $K'=SHA256(\Sigma_n^1 f')=SHA256(\Sigma_n^1(s'+e))=SHA256(\Sigma_n^1 s'+\Sigma_n^1 e)$.

On Step 450, a cryptographic process may be performed on the data item using the data-specific key. Such as on Step 250 of FIG. 2A, Step 270 of FIG. 2B, Step 350 of FIG. 3A, Step 370 of FIG. 3B, or the like. As can be appreciated, throughout this cryptographic process, the root key may never exist in one place.

Figure 5A:
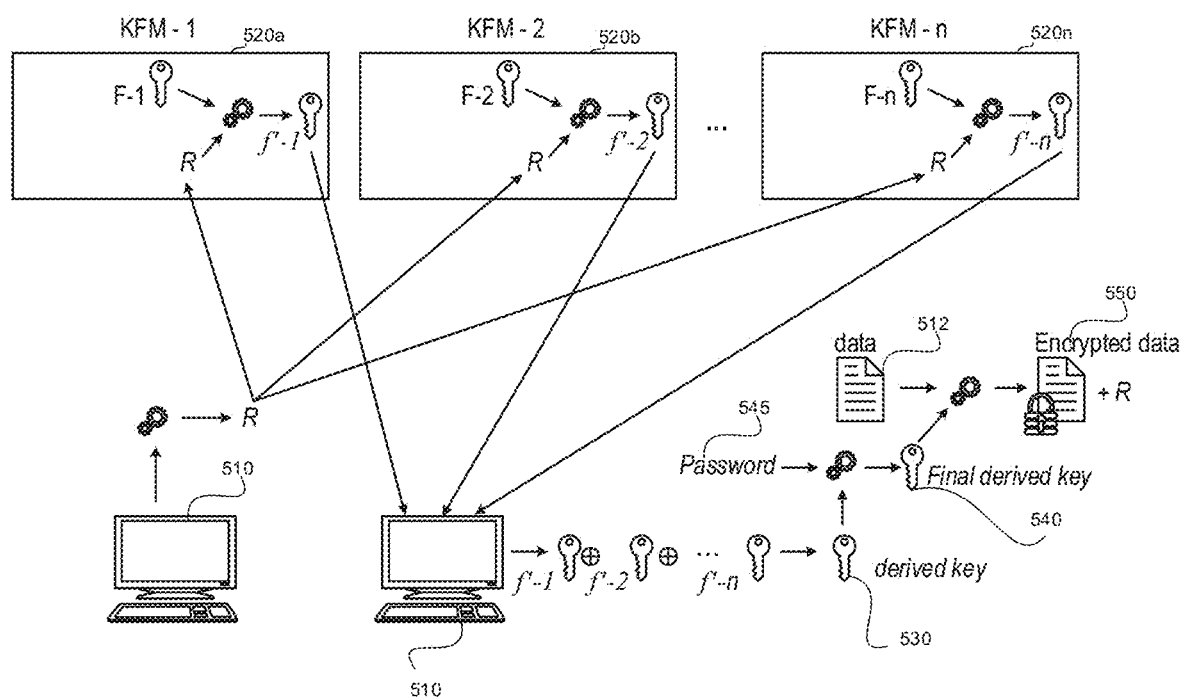
FIGS. 5A-5B show schematic illustrations an exemplary environment and architecture, in accordance with some exemplary embodiments of the disclosed subject matter.
Figure 5B:
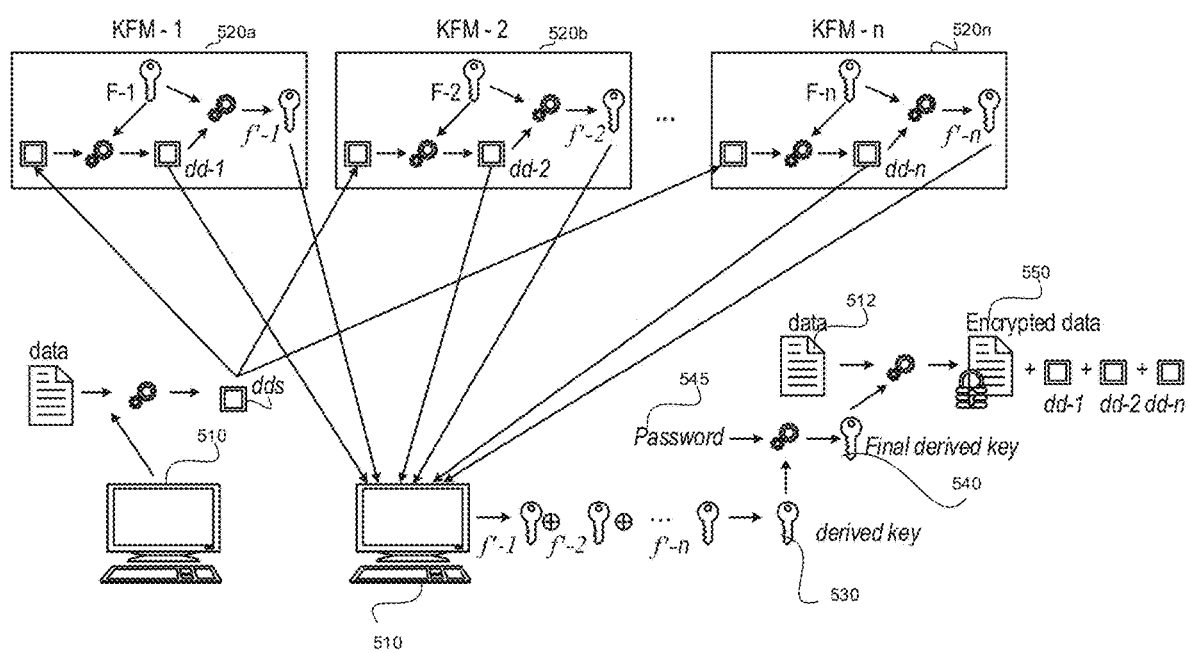

Referring now to FIG. 5A showing a schematic illustration of an exemplary environment and architecture in which non-deterministic cryptographic processes may be performed, in accordance with some exemplary embodiments of the disclosed subject matter.

In some exemplary embodiments, a Client Device 510 may obtain the identifier of the key to be used. Client Device 510 may generate a random byte array, R, such as a random number, representing the data item being encrypted (Data 512). Client Device 510 may send a derivation request to a plurality of KFM instances, 520a-520n. The derivation request may comprise the identifier of the key and the identifier of the data item (e.g., random byte array R).

In some exemplary embodiments, each KFM may retrieve a root key fragment from its database (e.g., $F_1, F_2, \ldots F_n$). The retrieval may be performed using the key identifier supplied in the derivation request. Each KFM instance may perform a derivation function on the root key fragment and the random byte array R. The derivation function may be, for example, an KDF algorithm where the fragment key used as the key and R is used as the salt, so that: f'=KDF(f,R). Each KFM instance may send the derived key fragment $f'_i$ to Client Device 510.

In some exemplary embodiments, Client Device 510 may receive all the derived keys fragments $f'_1, f'_2, \ldots, f'_n$. Client Device 510 may perform a computation to derive Derived Key 530 to be used for the decrypt/encrypt operation. The computation may be, as an example, performing a XOR operation on all key fragments, $K'=f'_1 \oplus f'_2 \oplus \ldots \oplus f'_n$.

In some exemplary embodiments, Client Device 510 device may obtain a Password 545 not available to any of the KFM instances 520a-520n and not known the system vendor. Password 545 may be utilized to derive a Final Derived Key 540 to be used for encryption/decryption. In some exemplary embodiments, Final Derived Key 540 may be computed as K"=KDF(K',password). In some exemplary embodiments, the derivation function may be the same or different than that used by the KFM instances 520a-520n. Additionally, or alternatively, the derivation of the K" may be obtained differently, such as by XORing an outcome of the password with K'.

In some exemplary embodiments, Data 512 may be encrypted on the Client Device 510 using Final Derived Key 540 and a nondeterministic encryption algorithm (e.g. AES-GCM) to obtain an Encrypted Data Item 550. Encrypted Data Item 550 may be stored by Client Device 510. together with the random byte array R. As can be appreciated, throughout this encryption process, the root key never exists in one place.

Additionally or alternatively, in order to perform a non-deterministic data decryption, Client Device 510 may retrieve the random byte array R that may be stored together with the encrypted data. Client Device 510 may obtain the Final Derived Key 540 similarly as described above. Encrypted Data Item 550 may be decrypted using Final Derived Key 540 and a nondeterministic encryption algorithm.

Referring now to FIG. 6B showing a schematic illustration of an exemplary environment and architecture in which deterministic cryptographic processes may be performed, in accordance with some exemplary embodiments of the disclosed subject matter.

In some exemplary embodiments, a Client Device 510 may obtain the identifier of the key to be used, and Data 512 to be encrypted. In some exemplary embodiments, a derivation data seed dds may be obtained by Client Device 510 device. The Client Device 510 may calculate the SHA-256 cryptographic hash on Data 512 to obtain the derivation data seed, dds=hash(D).

In some exemplary embodiments, Client Device 510 may send a derivation request to a plurality of KFM instances, 520a-520n. The derivation request may comprise the identifier of the key and the data seed dds. In some exemplary embodiments, each KFM may retrieve a root key fragment from its database (e.g., $F_1, F_2, \ldots F_n$). The retrieval may be performed using the key identifier supplied in the derivation request. Each KFM instance may perform a derivation function on the root key fragment and data seed dds, to obtain a final derivation data dd. The derivation function may be, for example, an KDF algorithm where the root key fragment used as the key and data seed dds is used as the salt, so that: dd=KDF(f,dds).

In some exemplary embodiments, each KFM may perform a second derivation function on the root key fragment and the derivation data dd. The derivation function may be an KDF algorithm where the root key fragment f used as the key and the derivation data dd is used as the salt, so that: f'=KDF(f,dd). In some exemplary embodiments, the same KDF algorithm may be used for both derivations. Additionally, or alternatively, different algorithms may be used. Each KFM may send the derived key fragment f' to the Client Device 510 together with the derivations data dd.

In some exemplary embodiments, Client Device 510 may receive all the derived keys fragments $f'_1, f'_2 \ldots, f'_n$. Client Device 510 may perform a computation to derive Derived Key 530 to be used for the decrypt/encrypt operation. The computation may be, as an example, performing a XOR operation on all key fragments, $K'=f'_1 \oplus f'_2 \oplus \ldots \oplus f'_n$.

In some exemplary embodiments, Client Device 510 device may obtain a Password 545 not available to any of the KFM instances 520a-520n and not known the system vendor. Password 545 may be utilized to derive a Final Derived Key 540 to be used for encryption/decryption. In some exemplary embodiments, Final Derived Key 540 may be computed as K"=KDF(K',password). In some exemplary embodiments, the derivation function may be the same or different than that used by the KFM instances 520a-520n. Additionally, or alternatively, the derivation of the K" may be obtained differently, such as by XORing an outcome of the password with K'.

In some exemplary embodiments, Data 512 may be encrypted on the Client Device 510 using Final Derived Key 540 and a deterministic encryption algorithm (e.g. AES-SIV) to obtain an Encrypted Data Item 550. Encrypted Data Item 550 may be stored by Client Device 510 together with the all the derivations data dd. As can be appreciated, throughout this encryption process, the root key never exists in one place.

Additionally or alternatively, in order to perform a deterministic data decryption, Client Device 510 may retrieve derivations data dd that may be stored together with the encrypted data. Client Device 510 may obtain the Final Derived Key 540 similarly as described above. Encrypted Data Item 550 may be decrypted using Final Derived Key 540 and a deterministic encryption algorithm.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining a data identifier of a data item;

transmitting the data identifier to a plurality of Key Fragment Management (KFM) instances, wherein each KFM instance retains a root key fragment, wherein each KFM instance is configured to generate a data-specific key fragment by:

deriving, using the data identifier and the root key fragment, a pseudo-identifier, whereby obtaining a plurality of pseudo-identifiers from the plurality of KFM instances; and deriving, using the pseudo-identifier and the root key fragment, the data-specific key fragment;

obtaining from the plurality of KFM instances, a plurality of data-specific key fragments;

generating a data-specific key based on the plurality of data-specific key fragments;

performing a cryptographic process, wherein the cryptographic process is an encryption of the data item using the data-specific key to provide an encrypted data item; and storing the encrypted data item and storing the plurality of pseudo-identifiers in a manner allowing retrieval thereof for the encrypted data item.

2. The method of claim 1, wherein said obtaining the data identifier comprises generating a non-deterministic data identifier.

3. The method of claim 1, wherein at least two KFM instance are provided by two different service providers.

4. The method of claim 1 further comprises:
obtaining, in a local environment, a user key fragment, wherein said generating the data-specific key is performed in the local environment and based on the plurality of data-specific key fragments and based on the user key fragment.

5. The method of claim 1, wherein said obtaining the data identifier comprises applying a hash function on the data item.

6. The method of claim 1, wherein each KFM instance is configured to generate at least a portion of a respective root key fragment independently.

7. The method of claim 1, wherein each KFM instance is configured to generate a respective root key fragment using a random function.

8. The method of claim 1, wherein a root key that is an aggregation of the root key fragments is never assembled.

9. The method of claim 1,
wherein each root key fragment comprises a static key fragment and an ephemeral key fragment, wherein a root key is an aggregation of the static key fragments and ephemeral key fragments;
wherein the method further comprises updating at least a portion of the ephemeral key fragments of the KFM instances without modifying the root key.

10. A method comprising:
obtaining a data identifier of a data item;
transmitting the data identifier to a plurality of Key Fragment Management (KFM) instances, wherein each KFM instance retains a root key fragment, wherein each KFM instance is configured to generate a data-specific key fragment by:
  deriving, using the data identifier and the root key fragment, a pseudo-identifier, whereby obtaining a plurality of pseudo-identifiers from the plurality of KFM instances; and
  deriving, using the pseudo-identifier and the root key fragment, the data-specific key fragment;
obtaining from the plurality of KFM instances, a plurality of data-specific key fragments;
generating a data-specific key based on the plurality of data-specific key fragments;
performing a cryptographic process, wherein the cryptographic process is a decryption of an encrypted data item using the data-specific key to obtain the data item;
wherein said obtaining the data identifier comprises retrieving the plurality of pseudo-identifiers for the encrypted data item; and
wherein said transmitting comprises transmitting the plurality of pseudo-identifiers to the plurality of KFM instances, wherein each KFM instance is configured to generate the data-specific key fragment based on the pseudo-identifier and based on the root key fragment using a single derivation process.

11. A computer program product comprising a non-transitory computer readable storage medium retaining program instructions, which program instructions when read by a processor, cause the processor to perform a method comprising:
obtaining a data identifier of a data item;
transmitting the data identifier to a plurality of Key Fragment Management (KFM) instances, wherein each KFM instance retains a root key fragment, wherein each KFM instance is configured to generate a data-specific key fragment by:
  deriving, using the data identifier and the root key fragment, a pseudo-identifier, whereby obtaining a plurality of pseudo-identifiers from the plurality of KFM instances; and
  deriving, using the pseudo-identifier and the root key fragment, the data-specific key fragment
obtaining from the plurality of KFM instances, a plurality of data-specific key fragments;
generating a data-specific key based on the plurality of data-specific key fragments; and
performing a cryptographic process relating to the data item using the data-specific key, wherein the cryptographic process is an encryption of the data item using the data-specific key to provide an encrypted data item, and
storing the encrypted data item and storing the plurality of pseudo-identifiers in a manner allowing retrieval thereof for the encrypted data item.

12. A Key Fragment Management (KFM) system comprising:
one or more processors and memory, wherein said one or more processors are configured to:
obtain a data identifier of a data item;
transmit the data identifier to a plurality of Key Fragment Management (KFM) instances, wherein each KFM instance retains a root key fragment, wherein each KFM instance is configured to generate a data-specific key fragment by:
  deriving, using the data identifier and the root key fragment, a pseudo-identifier, whereby obtaining a plurality of pseudo-identifiers from the plurality of KFM instances; and
  deriving, using the pseudo-identifier and the root key fragment, the data-specific key fragment;
obtain from the plurality of KFM instances, a plurality of data-specific key fragments;
generate a data-specific key based on the plurality of data-specific key fragments;
perform a cryptographic process, wherein the cryptographic process is an encryption of the data item using the data-specific key to provide an encrypted data item; and
store the encrypted data item and storing the plurality of pseudo-identifiers in a manner allowing retrieval thereof for the encrypted data item.

13. The KFM system of claim 12, wherein comprising:
wherein said one or more processors are configured to:
decrypt the encrypted data item using the data-specific key to obtain the data item, wherein the decryption is performed after the plurality of pseudo-identifiers for the encrypted data item are retrieved and after the plurality of pseudo-identifiers are transmitted to the plurality of KFM instances, wherein each KFM instance is configured to generate the data-specific key fragment based on the pseudo-identifier and based on the root key fragment using a single derivation process.

* * * * *